US011936516B2

(12) United States Patent
Shetty et al.

(10) Patent No.: US 11,936,516 B2
(45) Date of Patent: Mar. 19, 2024

(54) USING HARDWARE PROFILES OF HARDWARE COMPONENTS TO DETERMINE PERFORMANCE ISSUES OF USER DEVICES

(71) Applicant: VMware LLC, Palo Alto, CA (US)

(72) Inventors: Rohit Pradeep Shetty, Bangalore (IN); Ravish Chawla, Atlanta, GA (US); Adam Chow, Atlanta, GA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 17/830,762

(22) Filed: Jun. 2, 2022

(65) Prior Publication Data

US 2023/0396487 A1 Dec. 7, 2023

(51) Int. Cl.
| | |
|---|---|
| *H04L 41/0668* | (2022.01) |
| *H04L 41/0631* | (2022.01) |
| *H04L 41/12* | (2022.01) |
| *H04L 41/16* | (2022.01) |
| *H04L 41/5074* | (2022.01) |

(52) U.S. Cl.
CPC ...... *H04L 41/0668* (2013.01); *H04L 41/0631* (2013.01); *H04L 41/12* (2013.01); *H04L 41/16* (2013.01); *H04L 41/5074* (2013.01)

(58) Field of Classification Search
CPC . H04L 41/0631; H04L 41/0668; H04L 41/12; H04L 41/16; H04L 41/5074
USPC .......................................................... 709/224
See application file for complete search history.

(56) References Cited

U.S. PATENT DOCUMENTS

| | | | |
|---|---|---|---|
| 10,073,421 B2* | 9/2018 | Sayyarrodsari | ...... G05B 13/048 |
| 2011/0165869 A1* | 7/2011 | Guzman | ................. H04W 8/24 |
| | | | 455/418 |
| 2012/0062912 A1 | 3/2012 | St. Jacques, Jr. | |
| 2013/0018950 A1 | 1/2013 | Narayanan | |
| 2013/0260834 A1 | 10/2013 | Ingalls | |
| 2013/0332303 A1* | 12/2013 | Schank | ............... H04L 43/0817 |
| | | | 705/26.4 |
| 2014/0289415 A1 | 9/2014 | Chan | |

(Continued)

FOREIGN PATENT DOCUMENTS

WO    WO2022228689    11/2022

OTHER PUBLICATIONS

The Authoritative Dictionary of IEEE Standard Terms 412 (def. 122 (7th ed. 2000). (Year: 2000).*

*Primary Examiner* — David P Zarka
(74) *Attorney, Agent, or Firm* — King Intellectual Asset Management

(57) ABSTRACT

Systems and methods are described for providing recommendations for a user experience in online meetings. A recommendation engine can aggregate data from user devices to make recommendations before, during and after online meetings. Before a meeting, the recommendation engine can recommend which of a user's devices to use for the meeting. During the meeting, the recommendation engine can identify current or anticipated issues and recommend changes the user can make to correct or prevent the issue. After meetings, the recommendation engine can aggregate data and identify an ongoing issue for one or multiple users. The recommendation engine can identify the cause of the issue and make recommendations to the user or an administrator accordingly.

17 Claims, 7 Drawing Sheets

(56) References Cited

U.S. PATENT DOCUMENTS

| | | | |
|---|---|---|---|
| 2015/0095311 A1* | 4/2015 | Gou | G06F 16/248 |
| | | | 707/722 |
| 2015/0237303 A1 | 8/2015 | Thapliyal | |
| 2016/0134428 A1 | 5/2016 | Ouyang | |
| 2016/0277242 A1 | 9/2016 | Sallam | |
| 2017/0353991 A1* | 12/2017 | Tapia | H04W 24/02 |
| 2019/0044795 A1* | 2/2019 | Boom | H04L 41/0681 |
| 2020/0409781 A1* | 12/2020 | Zhen | G06F 11/3006 |
| 2021/0029612 A1 | 1/2021 | Hassan | |
| 2021/0031791 A1* | 2/2021 | Fields | B60W 50/045 |
| 2021/0224265 A1* | 7/2021 | Madan | G06N 20/00 |

* cited by examiner

USING HARDWARE PROFILES OF HARDWARE COMPONENTS TO DETERMINE PERFORMANCE ISSUES OF USER DEVICES

BACKGROUND

Employees are working more and more from outside the office, such as at home, on planes, and at coffee shops. Although employees benefit from the flexibility and convenience of working outside the office, this has caused new issues to arise, particularly with online meetings. For example, if an employee connects to a public network for an online meeting, that network may not be as fast or reliable as an office network, which can result in poor audio or video quality during the meeting. Sometimes employees participate in online meetings while in public areas that are noisy. This can make it hard for the user to hear or the device's microphone can pick up excessive background noise.

Even when working in the office or at a quiet location with reliable network, issues can still arise. For example, an employee may join an online meeting not realizing that the battery level on the device is too low to last through the duration of the meeting. In another example, the microphone or webcam on a user device may be going bad, causing issues during online meetings, but the user is not able to figure out what is causing the problem. Any number of things can happen to cause problems during an online meeting for an employee, and it can be difficult for the employee to learn what remedies are available.

Employees also often have multiple devices that they use for work purposes, i.e., laptops, tablets, and smart phones. Each of these devices has its own hardware specifications, network capabilities, software specification and so on. The specifications of one device may give an employee a better experience during a meeting than another device, but the user has no way to know. For example, the employee may typically use his laptop for online meetings over the same network. The employee might frequently have network connectivity problems that cause the audio and video to cut in and out. The employee can be unaware that, at the time of day of the meeting, the network the laptop is connected to experiences extreme network congestion, resulting in slow speeds. In addition to being unaware of the network congestion issue, the employee also might not know that an alternative cellular data network is available with no congestion that the user could use if he switched to his smartphone.

Currently, users have no way of knowing the best device to use when joining an online meeting. Users typically have a primary device that they user for online meetings, and they only switch to a better device after running into problems during the meeting. Users also have no idea of the latest software or hardware equipment upgrade they are eligible for.

Also, administrators have limited capabilities in identifying ongoing issues affecting large numbers of users for online meetings and other job-related functions. Even when issues are identified, administrators must manually identify potential fixes. This is both time consuming and expensive. Companies offer various equipment and software applications from service providers that could fix many issues. However, these fixes generally go unused because employees are unaware that they even exist. Administrators are slow to address issues because there is no efficient way to identify issues and what is causing them.

As a result, a need exists for providing recommendations for an improved user experience during online meetings.

SUMMARY

Examples described herein include systems and methods for providing recommendations for an improved user experience in online meetings. Recommendations can be provided at three different times with respect to a scheduled online meeting: before the meeting, during the meeting, and after the meeting. Recommendations before a meeting can recommend any actions a user should take beforehand that may prevent potential issues during the meeting. Recommendations during the meeting can be based on issues identified or anticipated while the meeting is in progress and can provide a solution to such issues. Recommendations after a meeting can be based on issues experienced by multiple users over time and can identify potential fixes to such issues.

A recommendation engine can be implemented to provide recommendations. The recommendation engine can aggregate data from user devices enrolled in an organization. The aggregated data can include any data related to a user device's performance. For example, the data can include data about hardware, software, connectivity, location, and so on. The information can be collected and sent to the recommendation engine by a management application installed on the user devices. The recommendation engine can extract data points from the data received from the user devices and input the data points into one or more machine learning ("ML") models. The recommendation engine can also retrieve information from third parties to use as inputs to the ML models. For example, the recommendation engine can retrieve environment information (e.g., weather, noise levels, etc.) about a user device's location, information about a network that a user device is connected to, information about other available networks near the user device, manufacturer documentation for hardware and software, and third-party reviews. The ML models can be used to identify potential and existing issues and then output recommendations based those issue.

In providing recommendations before a scheduled meeting, the recommendation engine can use connectivity and location data from the user devices. Using the location data, the recommendation engine can retrieve information about the user's location that can have an impact on the user's experience during the meeting, such as severe weather events or excessive noise levels. The recommendation engine can use historical and current connectivity data for multiple user devices near the user, in combination with the location information, to make recommendations. For example, if a user has multiple user devices (e.g., the user has a smartphone, tablet, and laptop), the recommendation engine can recommend which user device to use for the meeting. As an example, if background noise is common at the user's location (e.g., the user is in a large office cafeteria around lunch time), then the recommendation engine can recommend the user device with the best noise cancelling microphone. The recommendation engine can also recommend making certain changes to a user device. For example, if the user's device is connected to a router in an office that experiences heavy network congestion at the scheduled time of the online meeting, then the recommendation engine can recommend connecting to an available cellular network or relocating to another location that experiences less network congestion.

During the online meeting, the recommendation engine can make recommendations based on measured or anticipated issues. For example, if user devices of other users in the meeting report that the user's audio quality is poor, the recommendation engine can recommend switching to one of the user's devices with a better microphone or connecting to a network with better speeds, depending on the cause. Additionally, if other user devices on the same network begin reporting network latency issues, then the recommendation engine can recommend switching to an alternative network that is available before the user begins having network latency issues. If other user devices in the meeting report excessive background noise from the user's device, then the recommendation engine can recommend moving to another location or running a software application installed on the user device that filters background noise.

The recommendation engine can aggregate data over time to identify issues that occur frequently. For example, if a user frequently has issues with background noise, then the recommendation engine can recommend a pair of headphones, a better microphone, or noise canceling software that the user can use. Some recommendations can be based on the cause. For example, poor video quality can be caused by a poor-quality webcam, network connectivity problems, an overworked central processing unit ("CPU"), or insufficient random-access memory ("RAM"). If the cause is a poor-quality webcam, then the recommendation engine can recommend using a different user device with a better camera for online meetings or buying a peripheral webcam to connect to the user device. If the issue is related to network connectivity and on the network side, then the recommendation engine can notify an administrator ("admin") if it is within the organizations network. If a network connectivity issue is on the user side, then the recommendation engine can recommend an alternate location or network for meetings. The recommendation engine can also recommend hardware replacement for the user to an admin. For example, if the user device's network card is known to be faulty based on third-party documentation, then the recommendation engine can recommend replacing the network card or the user device.

Recommendations can also be made based on issues experienced by a large number of users in an organization. For example, using the aggregated data, the recommendation engine can identify a threshold portion of user devices having incoming or outgoing audio quality issues, incoming or outgoing video quality issues, network speed issues, battery life deterioration issues, or any other similar issue on an enrolled user device. The recommendation engine can first attempt to identify a cause. For example, the recommendation engine can identify similarities between affected user devices and determine whether those similarities may be the cause. For example, the recommendation engine can identify affected user devices that are of the same make and/or model, use the same camera, have the same network card, have the same operating system ("OS") version, use the same camera driver, have the same CPU or memory specs, and so on. If a cause can be identified, the recommendation engine can make recommendations accordingly. For example, if a software fix is available from an approved software list, then the recommendation engine can recommend the software be installed. If a hardware issue exists, then the recommendation engine can recommend possible hardware fixes. For example, the recommendation engine can recommend replacing a user device, microphone, or webcam with another similar device on an approved device list. The recommendation engine can also recommend using a peripheral device, such as by recommending a peripheral webcam for users with an integrated webcam that is causing issues.

Multiple ML models can be applied to make recommendations for ongoing issues. For example, historical data can be inputted into a first ML model. The first ML model can be trained to identify issues in the historical data and output a profile for any identified issues. An issue profile can include any data used to identify, or relating to, the issue. The issue profile from the first ML model can be used as input for a second ML model, and the second ML model can determine a cause of the issue and output a cause profile that includes any data used to identify, or relating to, the determined cause. The cause profile can then be used as input for a third ML model that identifies recommendations.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for providing recommendations for an improved user experience in online meetings. A recommendation engine can aggregate data from user devices to make recommendations before, during and after online meetings. Before a meeting, the recommendation engine can recommend which of a user's devices to use for the meeting. During the meeting, the recommendation engine can identify current or anticipated issues and recommend changes the user can make to correct or prevent the issue. After meetings, the recommendation engine can aggregate data and identify an ongoing issue for one or multiple users. The recommendation engine can identify the cause of the issue and make recommendations to the user or an administrator accordingly.

Figure 1:
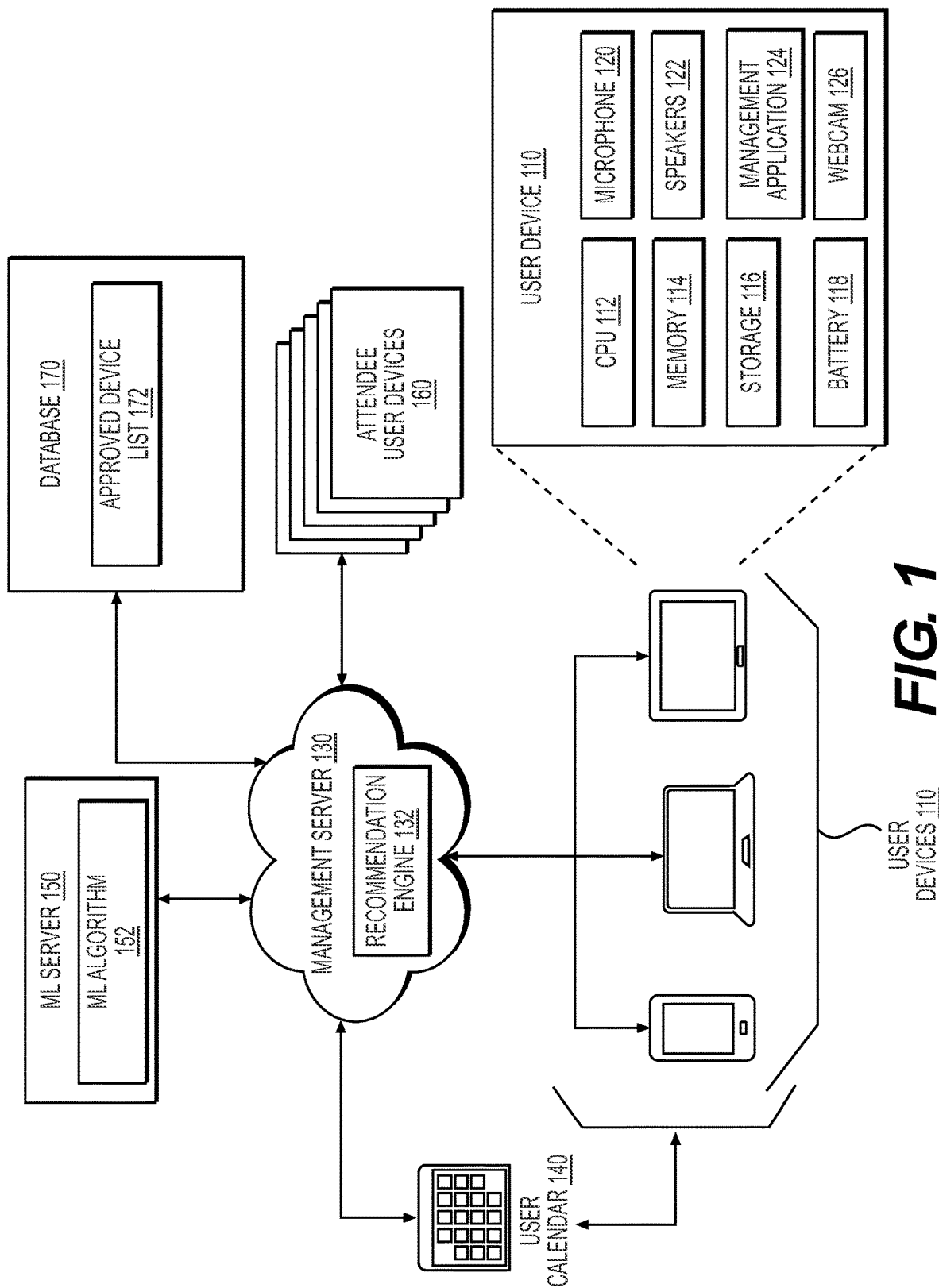
FIG. 1 is an illustration of an example system for providing recommendations for an improved user experience in online meetings.
Figure 2:
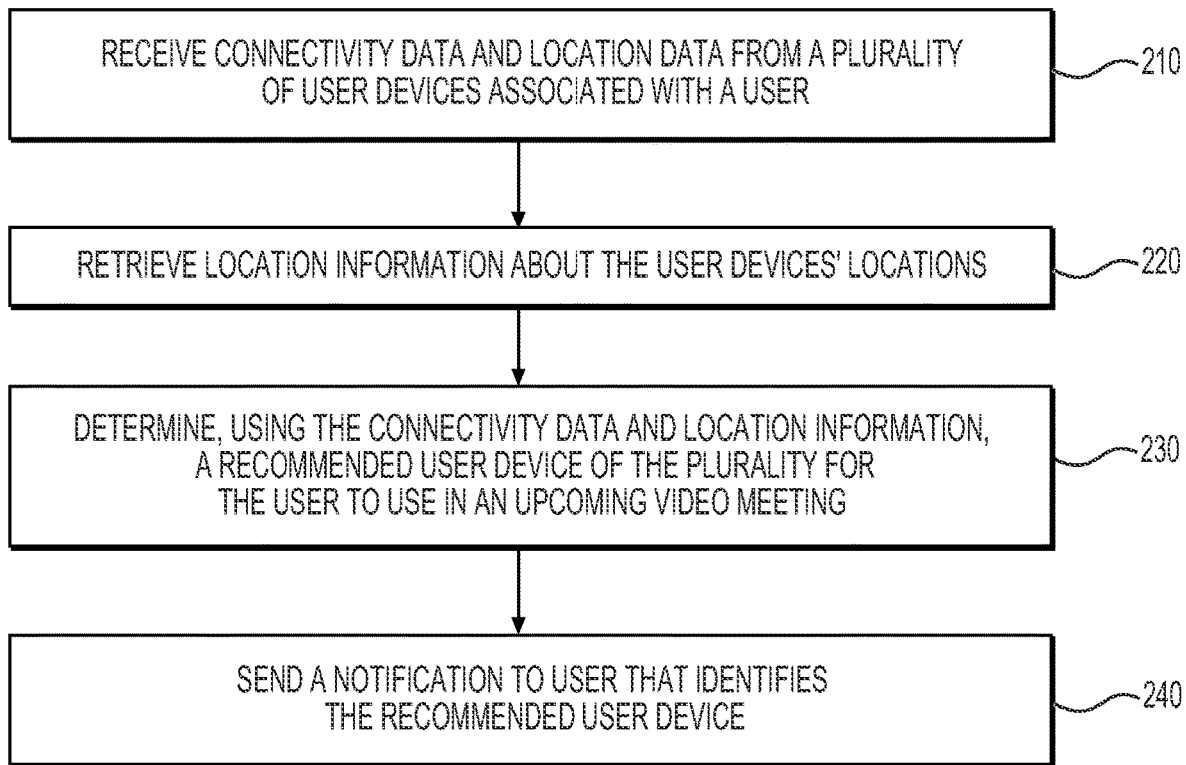
FIG. 2 is a flowchart of an example method for providing recommendations for an improved user experience for an upcoming online meeting.
Figure 3:
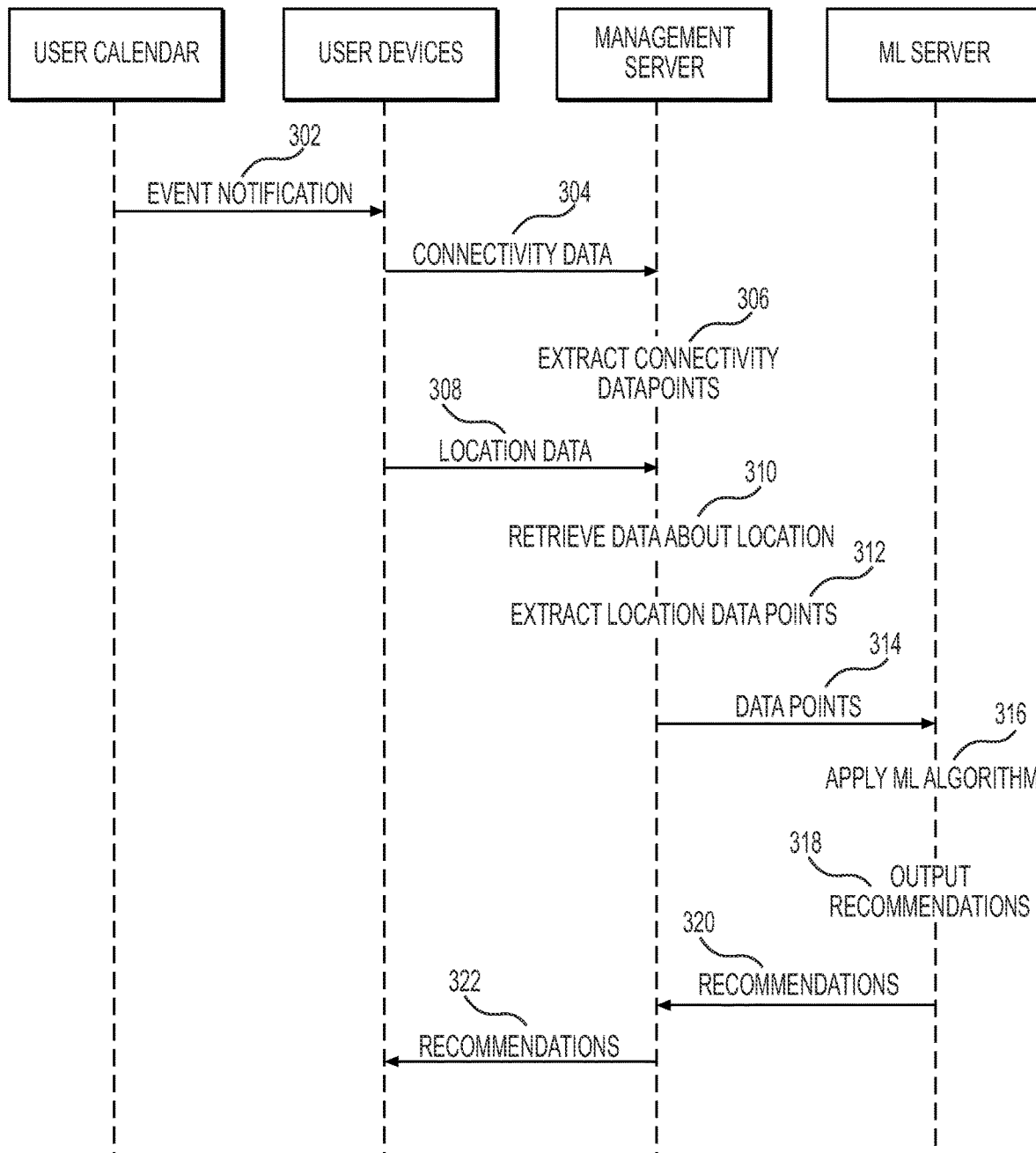
FIG. 3 is a sequence diagram of an example method for providing recommendations for an improved user experience for an upcoming online meeting.
Figure 6:
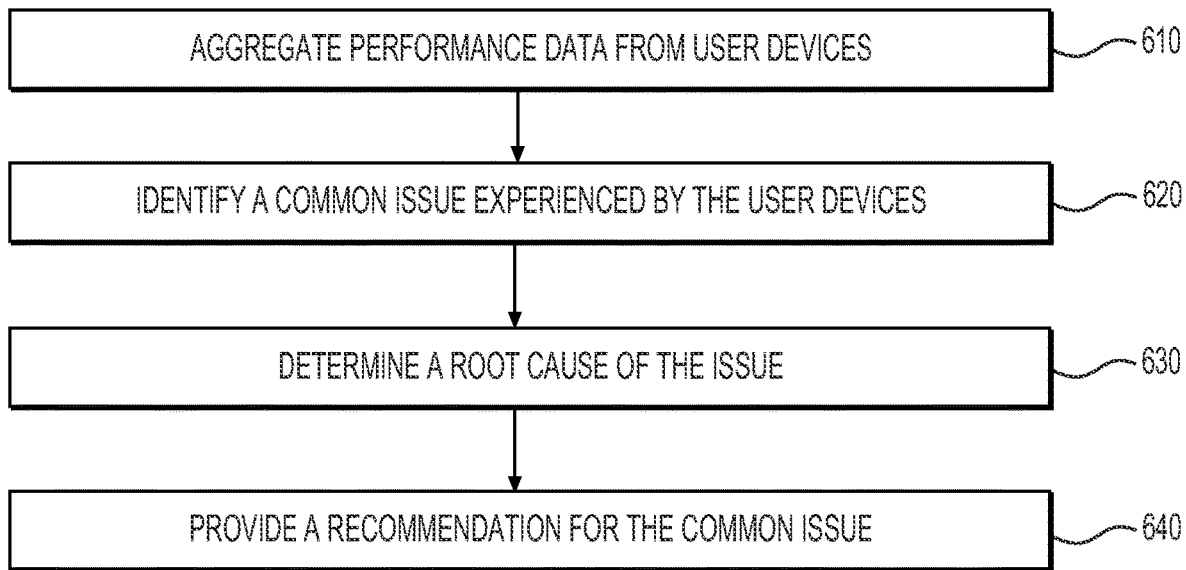
FIG. 6 is a flowchart of an example method for providing organizational hardware and software recommendations based on performance data from user devices during online meetings.
Figure 7:
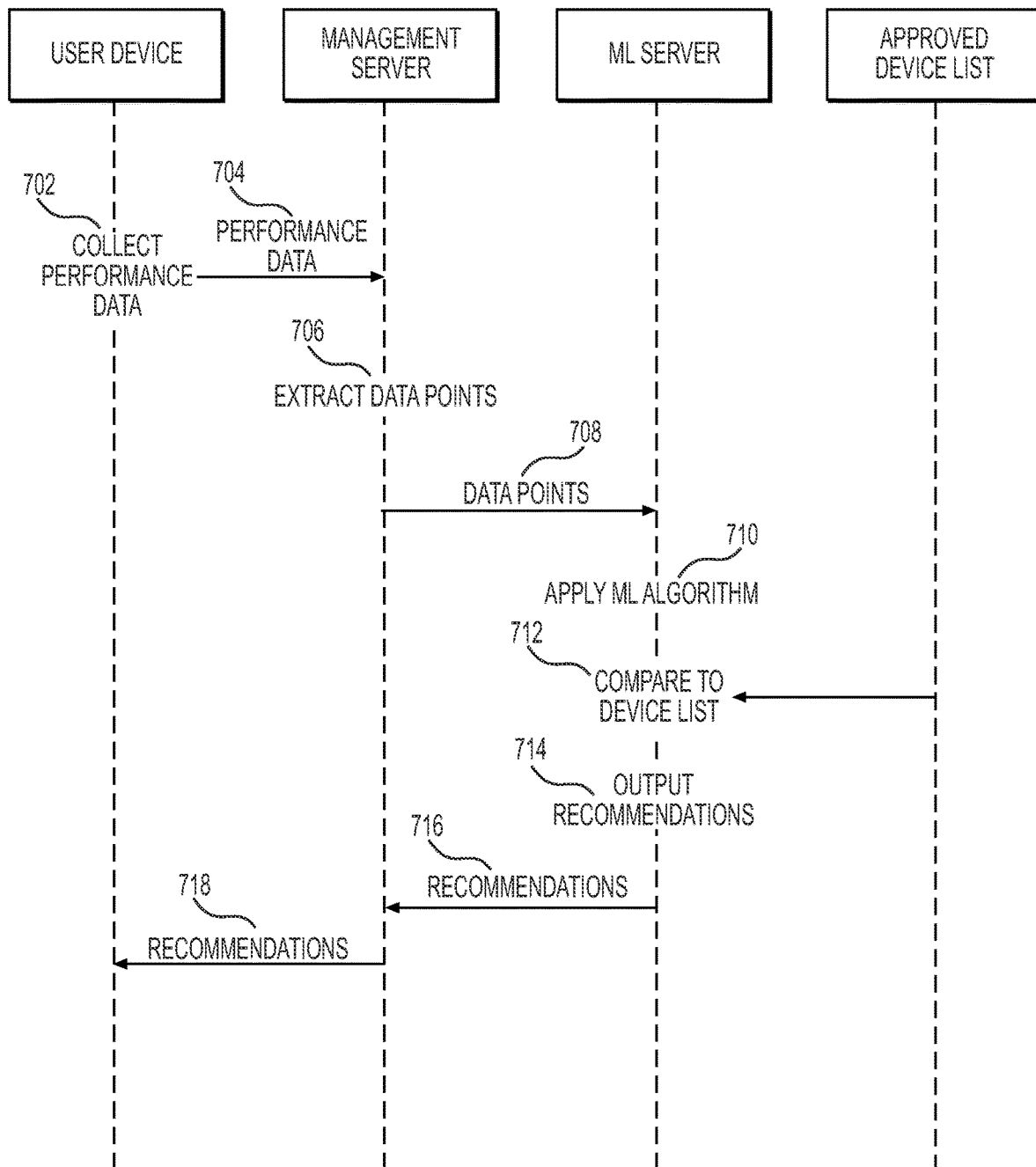
FIG. 7 is a sequence diagram of an example method for providing organizational hardware and software recommendations based on performance data from user devices during online meetings.

FIG. 1 is an illustration of an example system that can be used for performing the methods described herein. FIGS. 2 and 3 illustrate an example method and sequence diagram, respectively, for providing recommendations before a scheduled online meeting. FIGS. 2 and 3 illustrate an example method and sequence diagram, respectively, for providing recommendations before a scheduled online meeting. FIGS. 6 and 7 illustrate an example method and sequence diagram, respectively, for identifying an ongoing issue for one or multiple users, identifying the cause of the issue, and providing a recommendation for fixing the issue.

FIG. 1 is an illustration of an example system for providing recommendations for an improved user experience in online meetings. The system can be part of any system for managing a group of user devices, such as a Unified Endpoint Management ("UEM") system. Users can have one or more user devices 110 enrolled in the UEM system. The user devices 110 can be one or more processor-based devices, such as a personal computer, tablet, or cell phone. The user devices 110 can be user-owned or assigned to the user by the organization. The user devices 110 can have various hardware components needed to allow the user to participate in online meetings. For example, the user devices 110 can include a CPU 112, memory 114, storage 116, a battery 118, a microphone 120, speakers 122, and camera 126. The memory 114 can be a short-term storage component, such as RAM. The storage 116 can be a used for longer-term storage, like a hard drive. The microphone 120, speakers 122, and camera 126 can be integrated or peripheral components of the user devices 110. For example, the microphone 120 and camera 126 can be part of a webcam that plugs into a Universal Serial Bus ("BUS") or other connection port on a user device 110. As used herein, the user devices 110 can be user devices that belong to a particular user in an organization. The attendee user devices 160 can be user devices that are also enrolled in the UEM system but belong to other users that attend an online meeting with the user of the user devices 110. The attendee user devices 160 can therefore include the same internal and peripheral components of the user devices 110.

A management server 130 can be responsible for managing user devices that are enrolled in the UEM system. The management server 130 can be a single server or a group of servers, including multiple servers implemented virtually across multiple computing platforms. The management server 130 can manage the user devices 110,160 by sending management instructions to a management application 124 installed on them. The management application 124 can be a stand-alone application, part of an enterprise application, or part of an operating system of the user devices 110, 160.

The management application 124 can be downloaded and installed at the user device 110 prior to, or as part of, the enrollment process. For example, a user can download the management application 124 using a URL that points to a content delivery server with an installation file for the management application 124. The URL can be provided by the enterprise, for example. Alternatively, the user can download the management application 124 from an app store, such as APPLE's APP STORE or GOOGLE PLAY.

When the user launches the management application 124 for the first time, the management application 124 can prompt the user to enter authentication credentials, such as a username and password or a one-time password ("OTP") provided to the user by the enterprise. The management application 124 can send the user-provided credentials to the management server 130 in an encrypted format.

If the management server 130 can authenticate the credentials, then the management server 130 can begin provisioning the user device 110 for enterprise management. For example, the management server 130 can send a management profile to the management application 124. The management profile can include compliance and security settings assigned to the user's profile and any user groups that the user is assigned to. The management server 130 can also send a security certificate associated with the user's profile that can be used at the user device 110 to access enterprise data and resources, including managed applications. A managed application can be an application that allows control of access and functionality by the UEM system. The management server 130 can provision managed applications assigned to the user or the management profile. For example, the management server 130 can provide the management application 124 with installation files or URLs for retrieving the installation files for managed applications.

The management application 124 can configure the user device 110 using the management profile. For example, the management application 124 can install compliance and security settings from the management profile. As an example, the management application 124 can encrypt all or a portion of the user device's hard drive, apply virtual private network ("VPN") settings for accessing UEM data and resources, and set device access controls (e.g., password or personal identification number ("PIN") requirements). The management application 124 can also install and configure managed applications for the user device 110.

After enrollment is complete, the UEM system can actively manage the user device 110 by sending, via the management server 130 or another server in the UEM system, management commands, including any updated compliance and security settings, to the management application 124. The management application 124 can ensure that the user device 110 is up to date with the compliance and security settings prior to allowing access to enterprise data and resources. For example, the management application 124 can analyze the device state of the user device 110 using rules included in the management profile.

The device state can include various aspects of the user device 110, such as the device 110 manufacturer, model, and ID, a current battery charge level, whether the device 110 is jailbroken, OS type and version, geographic location, a login status of the user, and an identification of the applications installed on the device 110. The user device 110 can provide periodic updates of its state information to the management server 130. These updates can provide a full list of the various device aspects in one example, but in another example each update can identify changes from the previous device status update.

The management server 130 can send management commands to the management application 124 using any available communication protocol or channel. For example, the management server 130 can send management commands using an application programming interface ("API"), a notification system, a messaging system native to the user device 110, or a command queue. In one example using a command queue, the management server 130 can store one or more commands in a queue that is available to the user device 110 over a network. The commands can encompass any management action, such as instructing the user device 110 to download an application, report a device state, or apply a new profile. The management system can alert the user device 110 to a change in the command queue, such as by sending a notification to the user device 110 instructing the device to access the command queue. The notification can be sent through the management application 124 in some examples, but can also be sent as an OS-level notification or a message that utilizing an OS messaging scheme, such as a Short Message Service ("SMS") message.

The management application 124 can be responsible for ensuring that the user devices 110, 160 are up to date with compliance and security settings prior to accessing enterprise data and resources. The management application 124 can communicate with the management server 130, allowing UEM management of the user devices 110, 160 based on compliance and security settings at the management server 130. The management application 124 can enforce compliance at the user devices 110, 160, such as by locking a device, notifying an admin, or wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources. In one example, the user devices 110, 160 can access enterprise or UEM resources through the management server 130.

The management server 130 can include a recommendation engine 132. The recommendation engine 132 can be responsible for aggregating data from user devices 110, 160 enrolled in the UEM system that can have an impact on the users' experience in online meetings and when performing other job functions. For example, such data can include connectivity data, location data, and performance data. The connectivity data can include data about the network connection of the user device 110. This can include data indicating a network that the corresponding user device 110 is connected to and the measured strength, speed, and packet loss rate of the user device's connection to the network. The location data can include any data related to the location of the user device 110, such as historical data about the stability of a network that the user device 110 is currently connected to, alternative networks that may be available, local weather conditions that can impact a user device's connection to the network, and historical network congestion at the user's location based on the scheduled start time of an event. Performance data can include data relating to the user device's 110 performance and capabilities. For example, performance data can include data about hardware specs, such as CPU speed, RAM speed and capacity, storage capacity, battery capacity, connectivity capabilities (e.g., subscriber identity module ("SIM") card, WI-FI, BLUETOOTH, near field communications ("NFC"), etc.), waterproof rating, and dust rating. Performance data can also include data about integrated and peripheral components, such as the microphone 120, speakers, 122, webcam 126, etc. The performance data can also include data about software on the user device 110, such as the OS version, installed applications, and installed drivers.

The data can be stored in a database 170, such as a database server. The management application 124 can collect the data and send the data to the management server 130 or, alternatively, directly to the database 170 where it can be accessed by the recommendation engine 132. Some data, such as hardware specs and location data, can be retrieved from external sources, such as third-party servers. Data collected by the management application 124 can be collected and sent to the management server 130 as one or more data files, such as a JavaScript Object Notation ("JSON") file, Extensible Markup Language ("XML"), or other file type.

The recommendation engine 132 can use the data from user devices 110, 160 to provide recommendations to users. For example, the recommendation engine 132 can feed the connectivity data, location data, and performance data into one or more ML models 152. The data used to create a recommendation can depend on the type of recommendation. As an example, the recommendation engine 132 can access user calendars 140. When a user has an upcoming online meeting, the recommendation engine 132 can feed connectivity and location data into a first ML model 152 that outputs a recommended user device 110 to use for the meeting. The recommendation engine 132 can use a different ML model 152 to make recommendations during the meeting. For example, the recommendation engine 132 can feed relevant connectivity data, location data, and performance data into a second ML model 152 that can output recommended actions for the user to take when issues occur during the meeting. Examples of how the recommendation engine 132 can identify issues and corresponding recommendations is described in detail later herein.

Although the ML model 152 is illustrated as being separate from the recommendation engine 132, the ML model 152 can be a component of the recommendation engine 132. For example, the ML algorithm 152 can be retained at the management server 130 as part of the recommendation engine 132. Alternatively, the ML server 150 can include an agent of the recommendation engine 132 that inputs data into the ML model 152 and sends outputs from the ML model 152 to the recommendation engine 132.

The recommendation engine 312 can also be used to identify system-wide issues and recommend fixes. For example, the recommendation engine 312 can analyze the data from user devices 110, 160 to identify issues experienced by a large number of devices, determine the cause of the issues, and attempt to determine a fix. For example, for a hardware-related issue the recommendation engine 132 can access an approved device list 172 retained in the database 170 and identify a replacement device to an administrator ("admin"). The approved device list 172 can be a list of computing devices that are pre-approved by an organization. Examples of how the recommendation engine 132 can identify issues and corresponding recommendations for system-wide issues is described in detail later herein.

FIG. 2 is a flowchart of an example method for providing recommendations for an improved user experience for an upcoming online meeting. At stage 210, the recommendation engine 132 can receive connectivity data and location data from user devices 110 associated with a user. The connectivity data can include data about the network connection of a user device 110. For example, the connectivity data can indicate a network that the corresponding user device 110 is connected to and the measured strength and speed of the user device's connection to the network. The connectivity data can be collected by the management application 124. For example, the management application 124 can run a speed test and gather signal strength data from the OS of its corresponding user device 110.

An upcoming event in the user's calendar 140, such as an online meeting, can trigger the collection of connectivity data. For example, a predetermined amount of time before a scheduled meeting, such as 15 or 30 minutes, the recommendation engine 132 can send instructions to the management applications 124 on the user devices 110 to gather and send connectivity data. Alternatively, the management applications 124 can proactively gather and send the connectivity data the predetermined amount of time before the event.

The recommendation engine 132 can also receive information about the user devices 110 themselves. This can include, for example, hardware specifications, installed applications, available peripheral devices (such as a peripheral microphone 120, speaker 122, and/or camera 126), and hardware usage, such as the measured usage of the CPU 112, memory 114, and storage 116. The management application 124 can also inform the recommendation engine 132 of the power level of the battery 118 and indicate whether the user device 110 is connected to a power source or not.

Not all the user's devices 110 need to send connectivity data. For example, user devices 110 that are not near the user before the event are unlikely to be used by the user for the event. To save on computing and network resources, the management applications 124 can determine whether the corresponding user device 110 is near the user before collecting and sending connectivity data. The location of the user can be determined using a variety of methods. For example, a user device 110 that the user is most likely to be near the user, such as the user's smart phone, can be designated as the user's primary device. Any other user devices 110 that are near the primary device can collect and send connectivity data. Alternatively, the management server 130 can identify a user device 110 that the user is currently using and instruct the user's other nearby user devices 110 to provide connectivity data.

Once the user's location is determined, different methods can be used in determining whether a user device 110 is near the user. For example, the user devices 110 can send location data, such as Global Positioning System ("GPS") and/or Global System for Mobile Communications ("GSM") data to the management server 130. Based on the location data, each user device 110 within a predetermined distance from the user can be instructed to collect a send connectivity data. Alternatively, or in addition to location data, any user devices 110 connected to the same network as a user's primary device can collect and send connectivity data. In some cases, the last-received location information, such as the last network connection or GPS location, is used to estimate the location of the device, which may be currently powered off.

At stage 220, the recommendation engine 132 can retrieve location information using the location data. The location information can include information about the user device's location that may impact the performance of the user device 110 during the upcoming online event. For example, the recommendation engine 132 can retrieve historical data about the stability of a network that a user device 110 is currently connected to, identify alternative networks that may be available, retrieve information about local weather conditions that can impact a user device's connection to the network, retrieve network congestion where the user is based on the time of the schedule event, and so on.

In some examples, historical data about certain can be periodically retrieved and analyzed for purposes of user device recommendations. For example, if a user frequently connects to a certain network from enrolled user devices, then historical data about that network can be collected and aggregated. The recommendation engine 132 can calculate a score for the network based on factors like speeds, congestion, stability, security, and so on. When the user connects to the network before an online meeting, the recommendation engine 132 can retrieve the score for the network instead of processing all the historical data for the network every time user connects to the network for an upcoming meeting. The recommendation engine 132 can also score other networks available at the same location so that the networks can be quickly compared. Scores for networks can be based on the time of day. For example, the recommendation engine 132 can score networks by the hour or half hour, or only during business hours, for example. This can be useful, for example, when a network typically experiences high congestion or lower stability at a certain time of day. The recommendation engine 132 can use the score corresponding to the time of the scheduled meeting when making recommendations.

At stage 230, the recommendation engine 132 can determine a recommended user device 110 to use in the upcoming online event. In one example, the recommendation engine 132 can extract data points from the connectivity and location data, and then input the data points into the ML algorithm 152. Examples of data points that can be used as inputs can include an identifier ("ID") of a user device 110, the network it is connected to, the measured network speed and signal strength of the user device 110 to the network, network information about alternative networks available, the scheduled start time of the event, hardware identifiers, The following is an example of how the recommendation engine 132 can recommended a user device 132. In the example, one of the user's devices 110 can be designated the user's primary device. The primary device can be the user device 110 that the user most frequently uses. Alternatively, the primary device can be the user device 110 that the user most often uses for the type of event that the upcoming online event is. For example, if the online event is an audio meeting, and the user most often frequently uses his smart phone for audio meetings, then the user's smart phone can be designated the primary device for purposes of recommending a device to use. On the other hand, if the online event is a video meeting and the user most frequently uses a desktop computer with a webcam for such meetings, then the desktop computer can be designated the primary device.

When the user has a designated primary device, the recommendation engine 132 can determine whether the user should use an alternate user device 110 based on various metrics. Because the primary device is likely the user's preferred device, the recommendation engine 132 can recommend changing devices only if the recommendation engine 132 engine determines that the user is likely to encounter issues using the primary device, even if the metrics indicate that an alternative user device 110 would be better. For example, the recommendation engine 132 can compare the connectivity and location data of the primary device to predetermined metric thresholds. If the primary device satisfies the metric thresholds, then the recommendation engine 132 can be configured to take no further action before the online event regarding recommendations. However, if a metric threshold is not satisfied, then the recommendation engine 132 can compare the connectivity and location data of the user's other user devices 110 to the metric thresholds. If one or more of the other user devices 110 does satisfy the thresholds, then one of those devices 110 can be recommended to the user.

As an example, the user's primary device can be a laptop computer. The laptop computer can connect via WIFI to a network that is known to have issues at the time the online event is supposed to take place. For example, the historical data can indicate that, at the scheduled time of the event, devices connected to the network report a high latency rate. In one example, the network can be part of a satellite network, and the weather information can indicate that a heavy storm is incoming that can disrupt the satellite signal during the meeting. The recommendation engine 132 can identify a 5G network that is available, but the laptop does not have 5G capabilities. The recommendation engine 312 can eliminate any of the user's devices 110 that do not have 5G capability. The remaining user devices 110 can be assessed based on other metrics. For example, the recommendation engine 132 can compare the hardware of the remaining user devices 110 to identify the user device 110 with the best hardware for the even type. As an example, for an online video meeting, the recommendation engine 132 can recommend the user device 110 with the best camera 126 and microphone 120. For an audio only meeting, the recommendation engine 132 can recommend the user device 110 with the best microphone 120 and ignore the camera 126.

In the example above, if there is no designated primary device for the user, then the recommendation engine 132 can compare the metrics of each user device 110 near the user to identify the best user device 110 for the user to use. For example, for each user device 110, the recommendation engine 132 can assign a score to each metric and calculate an overall user experience score. The user device 110 with the highest user experience score can be recommended to the user. The metrics and scoring methods can be set by an admin.

The recommendation engine 132 can also consider battery level of each battery 118. The recommendation engine 132 can determine, based on a user device's current usage and anticipated usage for the online event, whether the user device 110 has enough battery power left to last until the scheduled end time of the event. For example, if the user's primary device has 15% battery power remaining and is not connected to a power source, and the recommendation engine 132 determines that 25% of the battery's power would be required to keep the primary device powered through the event, then the recommendation engine 132 engine can recommend an alternative user device 110 that has more battery power and/or is connected to a power source.

At stage 240, the recommendation engine 132 can send a notification to the user identifying the recommended user device 110. The notification can be any type of message that informs the user of the recommended user device 110. For example, the notification can be a push notification, web notification, email, or Short Message Service ("SMS") text. If the notification is a push notification or other notification sent directly to a user device, then the recommendation engine 132 can send the notification to those user devices 110 located near the user.

FIG. 3 is a sequence diagram of an example method for providing recommendations for an improved user experience for an upcoming online meeting. At stage 302, the user devices 110 can receive an event notification from the user's calendar 140. For example, the user devices 110 can be subscribed to notifications for events in the user's calendar 140. A predetermined amount of time before an event, the user devices 110 can receive a notification of the upcoming event.

At stage 304, the user devices 110 can send connectivity data to the management server 130, where it can be accessed by the recommendation engine 132. This can be handled by the management application 124. For example, the management application 124 for each user device 110 can collect data about the network that the user device 110 is connected to, the network's signal strength and speeds, any alternative available networks detected, and information about any processes running on the user device 110 that are consuming bandwidth. The management application 124 can send the connectivity data to the management server 130 using any communication protocol for transferring data, such as a Hypertext Transfer Protocol ("HTTP") or Application Programming Interface ("API") call.

At stage 306, the recommendation engine 132 can extract data points from the connectivity data. The data points can correspond to metrics used for recommending a user device 110 for the upcoming event. The data points can be extracted using rules defined for data fields in a template. As an example, one data field can have rules for network latency information, and another data field can have rules for packet loss rate. The recommendation engine 132 can create a data file for each user device 110 with measured values inputted into their corresponding fields in the template. The data file can be any kind of transferrable file, such as a JSON file, XML, or other file type. Although this stage is described as being performed by the recommendation engine 132, the management application 124 can be configured to extract the data points and create a data file using the connectivity data. The management application 124 can then send the data file to the management server 130.

At stage 308, user devices 110 can send location data to the recommendation engine 132. For example, the management application 124 can collect GPS and/or GSM and send the data to the management server 130, which can then be accessible by the recommendation engine 132.

At stage 310, the recommendation engine 132 can retrieve information about the provided locations. The location information can include information about the user device's location that may impact the performance of the user device 110 during the upcoming online event. For example, the recommendation engine 132 can retrieve historical data about the stability of a network that a user device 110 is currently connected to, identify alternative networks that may be available, retrieve information about local weather conditions that can impact a user device's connection to the network, retrieve network congestion where the user is based on the time of the schedule event, and so on.

At stage 312, the recommendation engine 132 can extract data points from the location information. Like the connectivity data described above, the data points can correspond to metrics used for recommending a user device 110 for the upcoming event. The data points can be extracted using rules defined for data fields in a template. As an example, one or more data fields can have rules for weather conditions, another data field can have a rule for inputting the start time of the event, another data field can have a field for historical network congestion, and another data field can have rules for noise levels near the user.

The recommendation engine 132 can create a data file for each user device 110 with measured values inputted into their corresponding fields in the template. Alternatively, the extracted data points for connectivity data and location data can be combined into the same data file. The recommendation engine 132 can also add information about the hardware of the user devices 110 to the data file.

At stage 314, the recommendation engine 132 can send the data points to the ML server 150. For example, the recommendation engine 132 can cause the management server 130 to send a data file with the data points to the ML server 150. The management server 130 can send the data file using any communication protocol for transferring data, such as HTTP or an API call.

At stage 316, the ML server 150 can input the data points into the ML algorithm 152. In an example where the ML algorithm 152 executes on the management server 130, the recommendation engine 132 can perform this stage. The ML algorithm 152 can be any teachable algorithm that uses data points related to a user's devices 110 and their environments to output recommendations for an upcoming online event. The ML server 150 can provide additional inputs that the ML algorithm 152 can use to make recommendations. For example, the ML server 150 can input hardware information about the user devices 110 and the type of event the recommendations are for. The event type can affect how the ML algorithm 152 processes the inputs. For example, if the event is a video call, then the ML algorithm 152 can more heavily weigh factors like network speed and stability, webcam and microphone quality, and anticipated background noise. On the other hand, if the event is an audio call, then the ML algorithm 152 can ignore webcam quality and lower any network speed thresholds due to audio requiring much less bandwidth than video.

At stage 318, can output recommendations. The type of recommendations outputted can depend on various factors, such as the event type and what actions are available to the user. As an example, a user has an upcoming video call. The ML algorithm 152 can determine that, at the scheduled time of the video call, the network that the user's device 110 is connected to may likely cause problems for the user during the call. This can be based on any number of input factors, such as the network's current measured speed being too slow, historical data indicating high congestion at the scheduled start time that often causes instability and slow speeds, or a weather event that may cause the network to drop. If an alternative network is available that is faster and more reliable, then the ML algorithm 152 can recommend that the user connect to that network. If the user's primary device 110, or the device 110 that the user is currently using, is unable to connect the alternative network (e.g., the user is using a laptop that cannot connect to a cellular network), then the ML algorithm 152 can recommend that the user switch to a user device 110 that can.

In one example, the ML algorithm 152 can recommend a user device 110 with a better peripherals, such as a better microphone 120, speakers 122, or webcam 126. For example, if the user is in a noisy location, the ML algorithm 152 can recommend a user device 112 with a microphone 120 that has good ambient noise filtering. Alternatively, if the recommended microphone 120 is an external device that can be used on multiple user devices 110, then the ML algorithm 152 can recommend that the user connect the recommended microphone 120 to the user's preferred device 110.

At stage 320, the ML server 150 can send the recommendations to the recommendation engine 132. For example, the ML server 150 can make an API call to the management server 130 to send the recommendations. At stage 322, the recommendation engine 132 can send the recommendations to the user device 110. The recommendation can be sent as any kind of message that informs the user about the recommendation, such as a notification, email, or chat message. The recommendation engine 132 can send the recommendations to one or multiple user devices 110. For example, the recommendation engine 132 can send the recommendations to only those devices 110 of the user that are located near the user. The user can then review the recommendations and choose what actions to take, if any, in preparation for the online event.

Figure 4:
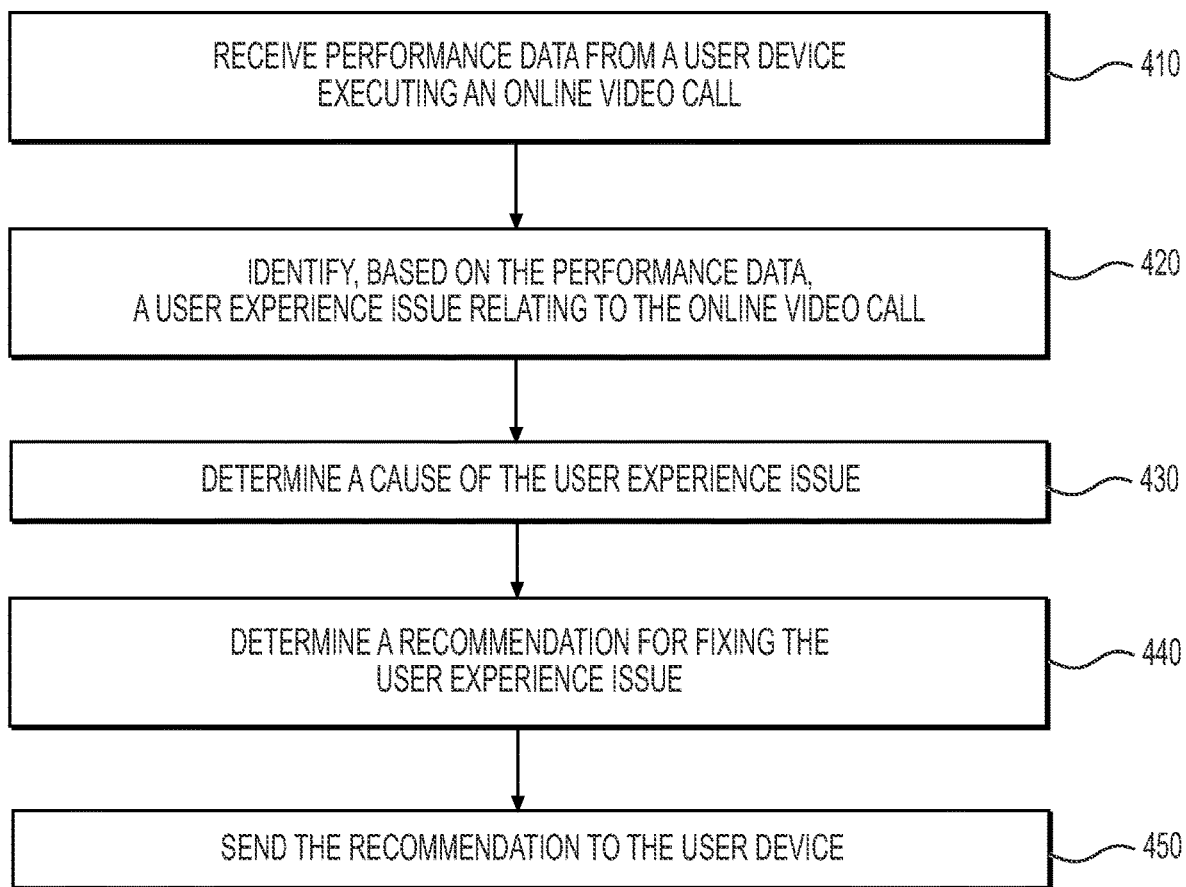
FIG. 4 is a flowchart of an example method for providing recommendations for an improved user experience during an online meeting.

FIG. 4 is a flowchart of an example method for providing recommendations for an improved user experience during an online meeting. At stage 410, the recommendation engine 132 can receive performance data from the user device 110 while it is executing an online meeting. Performance data can include any data that may be relevant to the user's experience during an online event. For example, performance data can data related to network speed, packet loss rate, background noise, video quality, and audio quality during an online event. The performance data can also include data about hardware on the user device 110, such as the usage of the CPU 112 and memory 114 or the battery level. The performance data can be collected by the management application 124 and sent to the management server 130 where it can be accessed by the recommendation engine 132.

At stage 420, the recommendation engine 132 can identify, based on the performance data, a user experience issue relating to the online meeting. For example, the recommendation engine 132 can identify poor incoming or outgoing audio quality, poor incoming or outgoing video quality, excessive background noise, or other similar issues. Some issues can be identified using performance data from attendee user devices 160 of other users participating in the online event. For example, attendee user devices 160 can report excessive background noise or poor audio or video quality being received from the user device 110.

Although this stage is described as being performed by the recommendation engine 132, the management application 124 can be responsible for identifying user experience issues. For example, the management application 124 can collect and analyze performance data during an online event. If an issue is detected, the management application 124 can notify the recommendation engine 132 and send performance data relevant to the issue. In one example, the management application 124 can include an agent of the recommendation engine 132 that analyzes the performance data to identify issues.

At stage 430, the recommendation engine 132 can determine a cause of the user experience issue. The recommendation engine 132 can do this using the performance data. For example, if the measured network connectivity is within allowable levels, but the CPU 112 or memory 114 usage rates are high, then the recommendation engine 132 can determine that the CPU 112 or memory 114 is the cause, and vice versa. If excessive background noise is detected, the recommendation engine 132 can determine that the user's location is the cause.

The recommendation engine 132 can also compare the performance data to historical data about the user to determine the cause. For example, the recommendation engine 132 can identify trends indicating that the user frequently has issues when using a certain user device 110, a certain microphone 112, a certain webcam 126, or is connected to a certain network. The recommendation engine 132 can also consider software running on the user device 110 during the online event. For example, if the memory 114 or CPU 122 usage on the user device 110 is high during the meeting, the recommendation engine 132 can look at what applications and services running that may be causing the high usage. As an example, if the user frequently has a large number of tabs open in a web browser, this can require significant memory usage.

At stage 440, the recommendation engine 132 can determine a recommendation for fixing the user experience issue. The recommendation can be based on the determined cause. For example, if the network that the user device 110 is connecting to is having congestion or latency issues, and if an alternative network without those issues is available, then switching to the alternative network can be recommended. If the user device 110 is unable to connect to the alternative network (e.g., the user device 110 does not have the proper hardware to connect to the alternative network), then the recommendation engine 132 can recommend that the user switch to another user device 110 and connect to the alternative network. If the issue is caused by high CPU 112 or memory 114 usage rates, then the recommendation engine 132 can recommend another of the user's devices 110 to use that has lower usage rates.

The recommendation engine 132 can determine multiple recommendations in some instances. For example, if the recommendation engine 132 detects loud background noise, the recommendation engine 132 can recommend that the user move to a quieter location. However, if another of the user device's 110 has a microphone 120 that better filters background noise, or if the user has access to a peripheral microphone 120 with a better noise filter, then the recommendation engine 132 can recommend switching to that device 110 or connecting the peripheral microphone 120.

If the user frequently experiences an issue using a particular user device 110, the recommendation engine 132 can cross-reference the issue with a list of available software or hardware that may provide a fix. For example, if the user frequently has loud background noise during online meetings while using a particular user device 110, the recommendation engine 132 can cross-reference the issue with the approved device list 172 to identify a device that may fix the issue. For example, the recommendation engine 132 can recommend a peripheral microphone or a pair of headphones that may block out background noise better than the user device 110. The approved device list 172 can also include approved software that can be recommended. For example, the recommendation engine 132 can recommend that the user download an approved software application that can filter background noise from existing microphones 120.

The recommendation engine 132 can also identify potential issues and provide recommendations before the issue arises. As an example, the recommendation engine 132 can collect performance data from other managed user devices connected the same network as the user device 110 during the online event. If the recommendation engine 132 identifies other user devices having network connectivity or latency problems, then the recommendation engine 132 can proactively recommend that the user switch to an alternative network that is available. In another example, if the recommendation engine 132 determines that the battery 118 may run out before the scheduled end of the online event, then the recommendation engine 132 can recommend that the user close any unneeded applications to preserve battery life or switch to another user device 110.

In an example, the recommendation engine 132 can determine a recommendation using the ML model 152. For example, the recommendation engine 132 can extract data points from the performance data and send the data points to the ML server 150 to use as inputs for the ML model 152. The ML model 152 can be the same as or different from model described in FIGS. 2 and 3 above. The ML model 152 can use the data points to identify a cause of the issue and output a recommendation. The ML server 150 can then send the recommendation to the management server 130. The examples use the terms algorithm and model interchangeably and are not meant to be limited to one or the other.

At stage 450, the recommendation engine 132 can send the recommendation to the user device 110. For example, the recommendation engine 132 can send a notification to the user device 110 that the user is using for the online event. The notification can be any type of message that informs the user of the recommendation. For example, the notification can be a push notification, web notification, chat message, or SMS text.

Figure 5:
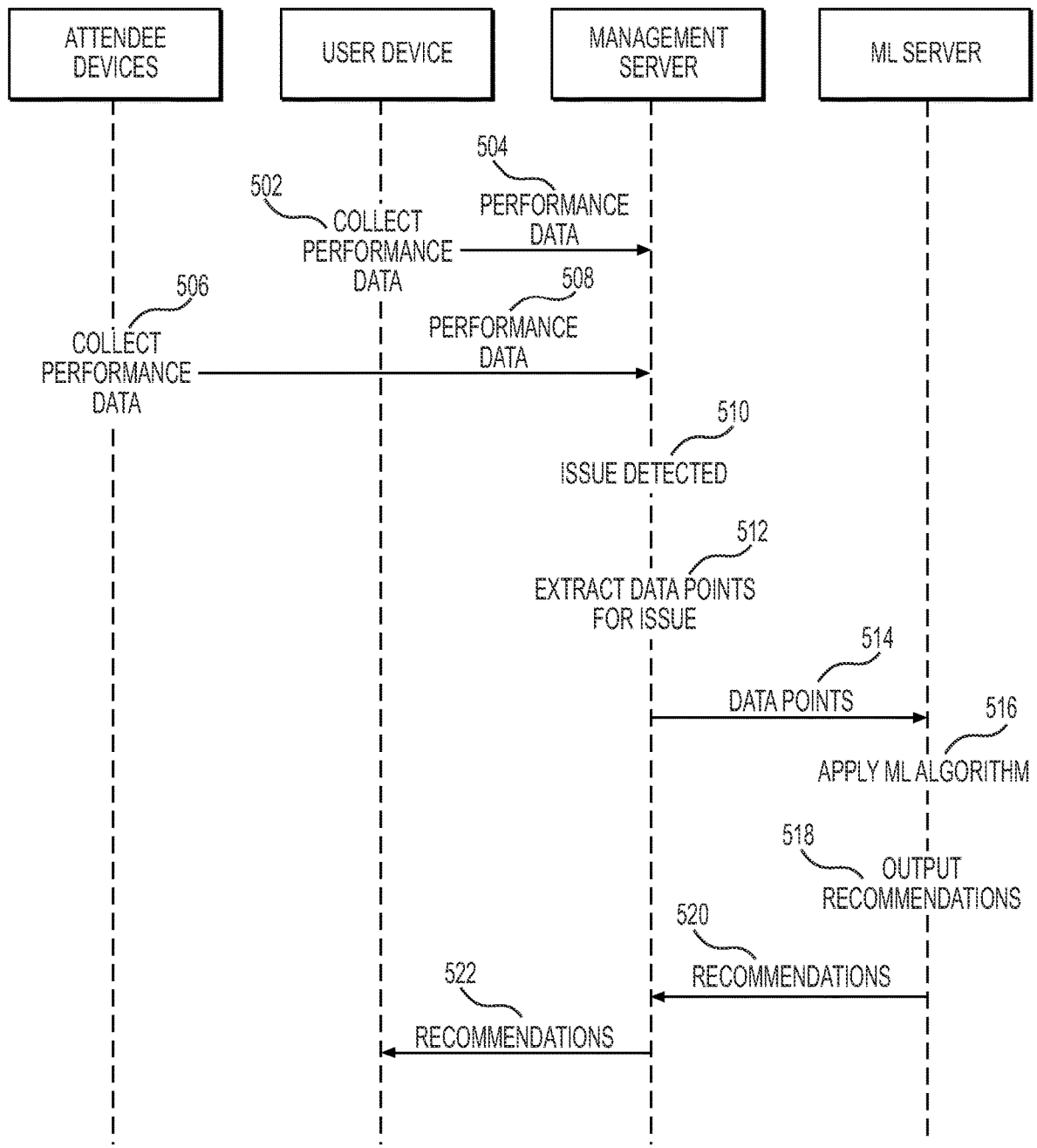
FIG. 5 is a sequence diagram of an example method for providing recommendations for an improved user experience during an upcoming online meeting.

FIG. 5 is a sequence diagram of an example method for providing recommendations for an improved user experience during an upcoming online meeting. At stage 502, the user device 110 can collect performance data. For example, the management application 124 on the user device 110 can collect data related to network speed, packet loss rate, background noise, video quality, audio quality, and the like during an online event. The management application 124 can also collect data about hardware and software on the user device 110, such as the usage of the CPU 112 and memory 114, the measured battery level, installed applications, and applications and services currently running.

At stage 504, the user device 110 can send the performance data to the recommendation engine 132. For example, the management application 124 can send the performance data by making an API call to the management server 130. The recommendation engine 132 can then access the performance data at the management server 130.

At stage 506, the attendee user devices 160 can collect performance data. For example, the recommendation engine 132 can collect performance data from all user devices 110, 160 attending the online event. This data can be compared during the meeting to determine whether an issue that arises may be specific to one particular device or may be a system issue. The management application 124 on the attendee user devices 160 can collect the performance data and, at stage 508, send the performance data to the management server 150.

At stage 510, the recommendation engine 132 can identify a user experience issue based on the performance data. Although this stage is described as being performed by the recommendation engine 132, alternatively the management application 124, or an agent of the recommendation engine 132 running on the user device 110, can identify the issue. The management application 124 can then send relevant data to the management server 130.

A user experience issue can be any occurrence that may have a negative impact on the user's experience during an online event. Some examples of user experiences issues can include poor incoming or outgoing audio quality, poor incoming or outgoing video quality, excessive background noise, and other similar issues. Some issues can be identified using performance data from attendee user devices 160 of other users participating in the online event. For example, attendee user devices 160 can report excessive background noise or poor audio or video quality being received from the user device 110.

At stage 512, the recommendation engine 132 can extract data points related to the issue. For example, the recommendation engine 132 can extract data points relating to the measured network speed, packet loss rate, audio quality, and video quality. The recommendation engine 132 can also extract data about the user device 110, such as installed applications, running applications and services, hardware specs, and so on. In addition, the recommendation engine 132 can extract data points relating to environmental factors, such as the user's location, the time of day, weather conditions, and performance data from other enrolled devices that are near the user device 110. At stage 514, the recommendation engine 132 can send the data points to the ML server 150.

At stage 516, the ML server 150 can input the data points into the ML algorithm 152. If the ML algorithm 152 is retained on the management server 130, then the recommendation engine 132 can perform this stage. The ML algorithm 152 can be any teachable algorithm that uses data points related to a user device 110 attending an online environment to output recommendations for resolving issues experienced during the event.

At stage 518, the ML algorithm 152 can output recommendations. The type of recommendations outputted can depend on various factors, such as the event type and what actions are available to the user. As an example, during a video call, if a user experiences poor video quality, then the ML algorithm 152 can use the data points to identify the likely cause and output a corresponding recommendation. For example, if the likely cause is network connectivity problems, such as high packet loss rate or high latency, then the ML algorithm 152 can output recommendations to address the network connectivity issue. If another network is available, the ML algorithm 152 can recommend switching to that network, or, if the user device 110 currently being used cannot connect to the network, the ML algorithm 152 can recommend switching to another device 110 that can. If another network is not available at the user's current location, but is available at a nearby location, then the ML algorithm 152 can recommend relocating closer to the nearby network. Similarly, if a router that the user device 110 is connected to is experiencing slow speeds due to high network traffic, then the ML algorithm 152 can recommend connecting to another router on the network, such as by moving to a different location within an office building.

For issues caused by high CPU 112 or memory 114 usage, the ML algorithm 152 can look at applications or services that the user can close. For example, if an application or service that uses high CPU 112 levels is running in the background of the user device 110, and if that application is not relevant to the online event, then the ML algorithm 152 can recommend closing the application. If a large number of open tabs in a web browser is causing high memory 114 usage, then the ML algorithm 152 can recommend closing unused tabs. The ML algorithm 152 can also recommend switching to another user device 110 that would not experience the same CPU 112 and memory 114 issues.

For issues with excessive background noise, the ML algorithm 152 can identify recommendations for reducing the noise. For example, if the user device 110 has noise canceling software installed that is not being used, the ML algorithm 152 can recommend using that software. If another of the user's devices 110 has a microphone 120 known to filter background noise better, then the ML algorithm 152 can recommend switching to that user device 110. The ML algorithm 152 can also recommend moving to a quieter area.

Recommendations can be based on more than just the current online event. For example, the recommendation engine 132 can provide historical data points from when the user experienced the same or a similar issue. The ML algorithm 152 can use the historical data points to better identify the cause of the issue and provide a better recommendation. For example, if issues frequently occur for a user that have the same root cause, then the ML algorithm 152 can recommend a solution that can address the root cause. This can include cross-referencing the issue with the approved device list 172. For example, if a user frequently has audio issues, then the ML algorithm 152 can recommend that the user purchase or is provided with a new microphone or a headset on the approved device list 172. The ML algorithm 152 can also make software recommendations, such as downloading a software application that filters background noise or a web browser extension that suspends unused browser tabs.

At stage 520, the ML server 150 can send the recommendations to the recommendation engine 132. For example, the ML server 150 can make an API call to the management server 130 to send the recommendations. At stage 522, the recommendation engine 132 can send the recommendations to the user device 110. The recommendation can be sent as any kind of message that informs the user about the recommendation, such as a notification, email, or chat message. The recommendation engine 132 can send the recommendations to one or multiple user devices 110. For example, the recommendation engine 132 can send the recommendations to just the user device 110 that the user is using for the online event. The user can then review the recommendations and choose what actions to take, if any.

FIG. 6 is a flowchart of an example method for providing organizational hardware and software recommendations based on performance data from user devices. At stage 610, the recommendation engine 132 can aggregate performance data from attendee user devices 160, which can include any enrolled user device, including user devices 110. As used herein, the term "performance data" is used to described data relating to any data that may be relevant to the user's experience during an online event, such as audio or video calls. However, this use of the term "performance data" is merely exemplary. For example, performance data can include any data related to the performance of enrolled user devices. The performance data can also include data relating to the performance of other device types that may be used for work purposes, such as peripheral microphones, cameras, speakers, and the like.

The aggregated performance data can include data relating to the user device's 110 performance and capabilities. For example, the recommendation engine 132 can collect data about each user device's hardware specs, such as CPU speed, RAM speed and capacity, storage capacity, battery capacity, connectivity capabilities (e.g., SIM card, WI-FI, BLUETOOTH, NFC, etc.), waterproof rating, and dust rating. The recommendation engine 132 can also collect data about integrated and peripheral components, such as a microphone 120, speakers, 122, webcam 126, etc. In addition to hardware, the recommendation engine 132 can also collect about software on each attendee user device 160, such as the OS version, installed applications, and installed drivers. The hardware and software information can be collected internally, such as from the management application 124 or an admin, or externally, such as from the manufacturer's specification documentation. The recommendation engine 132 can also collect information from independent third-party rating agencies about the hardware and software components. This rating information can be cross-referenced with performance data to help identify the root causes of issues.

The performance data can be aggregated by the management application 124. For example, the management application 124 can collect various types of data on its respective attendee user device 160. The data collected can be current and/or historical. The management application 124 can extract and aggregate data classified as performance data based on classification rules. These classification rules can be established at the management server 130 and distributed to the attendee user devices 160. The management application 124 can send the aggregated performance data to the management server 130. When a peripheral device is connected to an attendee user device 160, the management application 124 can collect information about the peripheral device, such as the manufacturer, model, hardware specs, and data about how the peripheral device performs.

At stage 620, the recommendation engine 132 can identify a common issue experienced by attendee user devices 160. The examples herein describe issues relevant to online events, such as audio or video calls, such as poor video or audio quality, network issues, microphone issues, webcam issues, and the like. However, these are merely examples and not meant to be limiting in any way. For example, issues experienced by attendee user devices 160 can include any issue that can negatively impact a user's ability to use the device in its intended way or to perform assigned responsibilities with the device. As some examples, such issues can include deteriorating battery life, poor durability, faulty hardware, and the like.

In an example, common issues can be identified by categorizing issues identified in performance data. For example, issues can be categorized as incoming or outgoing video quality, incoming or outgoing audio quality, background noise, and so on. Some issues for an attendee user device 160 can be identified using data from other attendee user devices 160. For example, an attendee user device 160 may not be able to detect when its outgoing audio or video to other attendee user devices 160 in a meeting is having issues. To address this, the other attendee user devices 160 can report the poor audio or video quality to the recommendation engine 132. The recommendation engine 132 can then categorize the issue.

In an example, the recommendation engine 132 can identify a common issue based on the frequency in which the issue occurs. For example, the recommendation engine 132 can track the rate at which an issue occurs over time. If the occurrence rate rises above a threshold rate, then the recommendation engine 132 can be configured to attempt to identify the cause and provide recommendations. The threshold rate can be a rate set by an admin. The frequency of the issue can be determined based on an individual attendee user device 160 or a group of devices 160. For example, the recommendation engine 132 can determine that a particular attendee user device 160 is repeatedly having the same issue and attempt to find a recommendation for that device 160. Alternatively, or in addition, the recommendation engine 132 can identify a group of attendee user devices 160 that are frequently experiencing the same issue.

At stage 630, the recommendation engine 132 can determine a root cause of the issue. The recommendation engine 132 can first determine whether the issue is related to the attendee user device 160 or is a network issue. For example, the root cause of some issues, such as poor audio and video quality, can be found at either the attendee user device 160 or on a network. The recommendation engine 132 can first analyze the measured network connectivity data in the performance data to determine whether the cause is rooted in the network. As an example, the recommendation engine 132 can determine whether packet loss rate, speeds, network load, and other factors are likely causing the issue. If attendee user devices 160 experiencing the issue while connected to an internal network of an organization, then the recommendation engine 132 can analyze data from the routers that the devices 160 are connecting to and other network devices. If the root cause is determined to be an internal network issue, then the recommendation engine 132 can notify an admin.

If the root cause is not a network issue, then the recommendation engine 132 can attempt to identify a root cause at the user device level. For example, the recommendation engine 132 can compare data about the attendee user devices 160 experiencing the issue and identify similarities. For example, the recommendation engine 132 can determine whether the affected devices 160 are from a similar manufacturer or of a similar model. The recommendation engine 132 can also compare hardware specs of the affected devices 160, such as the specs of their CPUs 112, memory 114, storage 116, battery, 118, microphone 120, speakers 122, and webcam 126. The recommendation engine 132 can also check software similarities, such as the OS version, installed applications, applications and services running when the issue occurs, and so on.

For any aspect shared by a large percentage of attendee user devices 160 experiencing the issue, the recommendation engine 132 can attempt to determine whether the shared aspect is the root cause. The percentage of attendee user devices 160 required to trigger such an analysis can be a threshold percentage set by an admin. The recommendation engine 132 can analyze the performance data of the affected devices 160 related to the shared aspect. As an example, if the issue is a video quality issue and most of the affected attendee user devices 160 have the same webcam 126, then the recommendation engine 132 can analyze the performance data related to the webcam 126. The recommendation engine 132 can include data from external sources as well. For example, the recommendation engine 132 can retrieve data from the manufacturer and trusted third-party review sites to identify any known issues with the webcam 126.

Even if the performance data does not provide conclusive evidence that a particular aspect is causing an issue, the fact that a large percentage of the affected devices 160 share an aspect can be sufficient to provide a recommendation. For example, if the issue is an audio quality issue and most of the affected devices 160 use the same microphone 120, even if the performance data does not clearly identify a problem with the microphone 120, the recommendation engine 160 can still recommend a solution based on the microphone 120.

At stage 640, the recommendation engine 132 can provide a recommendation for the common issue to an administrator, and end user, or both, as described in more detail below with respect to this stage of the method. In one example, the recommendation engine 132 can identify a recommended hardware option using the approved device list 172. A hardware option can include any computing device or component of a computing device, such as a user device, webcam, microphone, router, hard drive, and so on. As an example, if a microphone 120 is causing audio issues, then the recommendation engine 132 can recommend a peripheral microphone from the approved device list 172 or a new computer with a better microphone. If an issue is caused by degrading battery life in a laptop, then the recommendation engine 132 can recommend a replacement battery or a computer with a better battery life. For software issues, the recommendation engine 132 can recommend installing applications that can resolve an issue or uninstalling an application that may be causing an issue. The recommendation engine 132 can also determine when a driver is causing an issue and recommend rolling back to a previous driver. For example, if a new driver for a battery is causing a laptop or phone battery to drain more quickly or permanently shorten the battery life, then the recommendation engine 132 can recommend rolling back the driver update to a previous version.

In an example, the recommendation engine 132 can identify issues and recommendations using one or more ML models 152. For example, the recommendation engine 132 identify a hardware component associated with a large percentage of user devices affected by the issue. The recommendation engine 132 can extract data points from the performance data and other data sources related to the hardware component, and then send the data to the ML server 150. The ML model 152 can create a profile of the hardware component in relation to the issue. The profile can include any data that may indicate whether the hardware component is the cause. For example, the ML model 152 can compare the performance of the hardware component to expected performance metrics and output a profile that indicates where the hardware component is underperforming or where the hardware component's capabilities are insufficient for the required tasks. An admin can provide feedback on the recommendations, and that feedback can be used to retrain the ML model 152. For example, if the ML algorithm 152 incorrectly identifies the cause of the issue, then the admin can provide data used to identify the correct cause. The ML model 152 can be retrained with the feedback so that it can better identify the cause of similar issues in the future.

The recommendation engine 132 can also use ML models 152 to recommend devices for users based on user behavior and device usage. For example, a first ML model can be trained to learn user behavior trends based on various factors, such as a user's role, basic requirements of device needed based on a user's work, the general location where a user works and travel patterns, and other similar data. A second ML model can be trained to learn how a device is used by a user or users with similar roles. The second ML model can be trained using data related to the average lifespan of a device before replacement, software capabilities (maximum OS upgrade, support for certain apps, and so on), and general use cases of a device (e.g., the types of user to whom a particular device is assigned). A third ML model can be trained to map a device to a user. The third model can be trained using outputs from the first and second ML models. As an example, when a new user enrolls, information about the user and the user's role can be inputted into the first model, and the first model can output an aggregate user profile. The aggregate user profile can be used as an input to the third ML model to recommend a user device for the user. In another example, when an existing user is to be assigned a new device based on job requirements, or if the user upgrades to a new device, data about roles requirements and usage history on prior devices can be inputted into the second ML model. The second ML model can output an aggregate user profile, which can then be inputted into the third ML model to recommend a device for the user. In another example, if a new device is obtained by an organization, the hardware specs of the device can be inputted into the first ML model to generate a device profile. The device profile can be inputted into the third ML model to identify users or user groups to whom the new device is recommended.

The recommendation engine 132 can send recommendations to the affected users or an admin, depending on the example. For example, recommendations that do not require admin approval can be sent directly to the affected users, while recommendations that require admin approval can be sent to the admin. As an example, if the recommendation engine 132 recommends installing pre-approved software or that the user purchase a pre-approved peripheral device, such as a microphone, webcam, or headphones, then the recommendation engine 132 can send the recommendation directly to the user. For example, the recommendation engine 132 can send a push notification, web notification, chat message, email, or SMS text. On the other hand, if the recommendation engine 132 recommends a new smart phone or computer, then the recommendation engine 132 can notify the admin. The admin can then review the recommendation to determine whether to issue new devices to the affected users.

In some examples, some recommendations can trigger automated purchasing from a third-party system. As an example, the approved device list 172 can identify a vendor for certain devices and include information for purchasing the device. The recommendation engine 132 can be configured to purchase a recommended device in certain circumstances, such as when a set of rules or conditions are satisfied. As an example, if more than a threshold percentage of users are regularly experiencing an issue with the particular webcam, and if the recommendation engine 132 recommends replacing the webcam with a new webcam from the approved device list 172, then the recommendation engine 132 can trigger a purchase the new webcam for the affected users. Alternatively, the recommendation engine 132 can notify another server in the UEM system that purchases the devices. The recommendation engine 132 can notify an admin after making the purchase so that the admin can manually review the order and make any changes, if needed. The rules and conditions for automatic purchasing can be set by an admin.

FIG. 7 is a sequence diagram of an example method for providing organizational hardware and software recommendations based on performance data from user devices during online meetings. At stage 702, the user devices 110 can collect performance data. For example, the management application 124 on the attendee user devices 160 can collect data related to network speed, packet loss rate, background noise, incoming and outgoing video quality, incoming and outgoing audio quality, and so on. The management application 124 can also collect data about hardware and software on the attendee user devices 160, such as the usage of the CPU 112, memory 114, storage 116, the measured battery level, installed applications, and applications and services currently running.

At stage 704, the user devices 110 can send the performance data to the recommendation engine 132. For example, the management application 124 can send the performance data by making an API call to the management server 130. The recommendation engine 132 can then access the performance data at the management server 130.

At stage 706, the recommendation engine 132 can extract data points from the performance data. For example, the recommendation engine 132 can extract data points relating to the measured network speed, packet loss rate, audio quality, and video quality. The recommendation engine 132 can also extract data about the attendee user devices 160, such as installed applications, running applications and services, hardware specs, and so on. In addition, the recommendation engine 132 can extract data points relating to environmental factors, such as the user's location, the time of day, weather conditions, and performance data from other enrolled devices that are near the user device 110. At stage 708, the recommendation engine 132 can send the data points to the ML server 150.

At stage 710, the ML server 150 can input the data points into the ML algorithm 152. The ML algorithm 152, using the data points, can learn issues that are occurring for users. For example, the ML algorithm 152 can learn what issues are occurring, how often the issues occur, what attendee user devices 160 are experiencing the issues, and what the affected devices 160 have in common. Upon discovering an issue, the ML algorithm 152 can attempt to learn a root cause. For example, the ML algorithm 152 can use network connectivity data inputs to determine whether the root cause is network related. For example, the ML algorithm 152 can determine that a wireless router is not powerful enough to handle heavy traffic that regularly occurs at a certain time of day, determine that a wireless router does not have sufficient range to provide a reliable network connection to its designated area, or other similar issues.

If the issue is not network related, then the ML algorithm 152 attempt to identify a root cause at the user device level. This can include analyzing data related to the learned similarities of affected devices 160. For examples, if the issue is related to video quality, the ML algorithm 152 can identify shared aspects or components of the affected attendee user devices 160 that can affect video quality. For example, the ML algorithm 152 can determine that most of the affected devices 160 are of the same make and/or model, use the same camera, have the same network card, have the same OS version, use the same camera driver, have the same CPU or memory specs, and so on. The ML algorithm 152 can then analyze performance and other data related to those shared aspects to determine whether any of them may be the root cause. For example, the ML algorithm 152 can use data points from manufacturer documentation and third-party review sites to identify known issues with a hardware or software component. In another example, the ML algorithm 152 can determine that a certain OS version or driver causes problems with certain microphones or webcams.

Different ML algorithms can be used to learn issue trends and determine the cause of an issue. For example, a first ML algorithm can learn the issue trends occurring and output and issue profile. The issue profile can include information that identifies what the issue is, how frequently the issue occurs, and information about the attendee user devices 160 experiencing issues. The issue profile can be used as input for a second ML algorithm that determines the cause. Information from third parties can be used as inputs in combination with the issue profile in determining the cause. The second ML algorithm can output a profile of the cause.

At stage 712, the ML model 152 can compare the ML output to the approved device list 172. In one example, the database 170 can include a table that maps issues to hardware and software in the approved device list 172. Based on the issue, the ML model 152 can identify possible hardware or software to recommend. For example, if a microphone 120 is causing audio issues, then the recommendation engine 132 can recommend a peripheral microphone from the approved device list 172 or a new computer with a better microphone. If an issue is caused by degrading battery life in a laptop, then the recommendation engine 132 can recommend a replacement battery or a computer with a better battery life. For software issues, the recommendation engine 132 can recommend installing applications that can resolve an issue or uninstalling an application that may be causing an issue.

At stage 714, the ML output 152 can output a recommendation. The recommendation can be single or include multiple options. For example, background audio issues, the recommendations can include identifying a pair of headphones with a noise cancelling feature, a better microphone, and noise cancelling software. This gives users options to resolve the issue according to their personal needs. The ML model that outputs the recommendation can be different from any ML models that learn issue tendencies and identify issue causes. For example, continuing the previous example of two ML models (one for learning issue tendencies and one for identifying causes), a third ML model can use output from the second ML model as input in determining a recommendation. The third ML model can also incorporate data points from external sources, such as manufacturer documentation and third-party review sites.

At stage 716, the ML server 150 can send the recommendations to the recommendation engine 132. For example, the ML server 150 can make an API call to the management server 130 to send the recommendations. At stage 718, the recommendation engine 132 can send the recommendations to the affected attendee user devices 160. The recommendation can be sent as any kind of message that informs the user about the recommendation, such as a notification, email, or chat message.

For some recommendations, the recommendation engine can notify an admin. This can be done for recommendations that require admin approval. For example, recommendations for replacing smartphones or computers can be sent to admins for review. The admins can then carry out the device replacement if needed.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing organizational hardware and software recommendations, comprising:
    aggregating performance data from a plurality of user devices associated with an organization;
    identifying, based on the performance data, an issue experienced by a portion of user devices in the plurality of user devices at a rate above a threshold rate;
    identifying a hardware component associated with a percentage of the plurality of user devices above a threshold percentage;
    extracting data points from the performance data related to the hardware component;
    inputting the extracted data points into a first machine learning ("ML") model;
    receiving, as output from the first ML model, a hardware profile of the hardware component in relation to the issue, the hardware profile indicating measured performance levels of the hardware component in comparison to expected performance levels;
    determining, based on the hardware profile, that the hardware component is the cause of the issue;
    identifying, from a list of approved hardware, a hardware option that may fix the issue; and providing a recommendation identifying the hardware option as a potential fix to the issue, wherein:
the issue is identified by inputting the performance data into a second ML model that learns issue trends and outputs an issue profile of the issue,
the issue profile is inputted into the first ML model with the extracted data points, and
the hardware option is identified by inputting the hardware profile into a third ML model that outputs the recommendation.

2. The method of claim 1, further comprising automatically purchasing the hardware component from a third party based on a set of rules.

3. The method of claim 1, wherein the hardware component is a first user device model, and wherein the identifying the hardware option that can fix the issue includes identifying a second user device model.

4. The method of claim 1, wherein the first ML model cross-references the issue profile and extracted data points with third-party data to identify known issues with the hardware component related to the cause.

5. The method of claim 1, wherein the hardware component is a component of a network, and the recommended hardware option is a replacement network component.

6. The method of claim 1, wherein the recommended hardware option includes a peripheral device that can be connected to the portion of user devices in the plurality of user devices.

7. A non-transitory, computer-readable medium containing instructions that, when executed by a hardware-based processor, cause the processor to perform stages for providing organizational hardware and software recommendations, the stages comprising:
aggregating performance data from a plurality of user devices associated with an organization;
identifying, based on the performance data, an issue experienced by a portion of user devices in the plurality of user devices at a rate above a threshold rate;
identifying a hardware component associated with a percentage of the plurality of user devices above a threshold percentage;
extracting data points from the performance data related to the hardware component;
inputting the extracted data points into a first machine learning ("ML") model;
receiving, as output from the first ML model, a hardware profile of the hardware component in relation to the issue, the hardware profile indicating measured performance levels of the hardware component in comparison to expected performance levels;
determining, based on the hardware profile, that the hardware component is the cause of the issue;
identifying, from a list of approved hardware, a hardware option that may fix the issue; and
providing a recommendation identifying the hardware option as a potential fix to the issue, wherein:
the issue is identified by inputting the performance data into a second ML model that learns issue trends and outputs an issue profile of the issue,
the issue profile is inputted into the first ML model with the extracted data points, and
the hardware option is identified by inputting the hardware profile into a third ML model that outputs the recommendation.

8. The non-transitory, computer-readable medium of claim 7, the stages further comprising automatically purchasing the hardware component from a third party based on a set of rules.

9. The non-transitory, computer-readable medium of claim 7, wherein the hardware component is a first user device model, and wherein the identifying the hardware option that can fix the issue includes identifying a second user device model.

10. The non-transitory, computer-readable medium of claim 7, wherein the first ML model cross-references the issue profile and extracted data points with third-party data to identify known issues with the hardware component related to the cause.

11. The non-transitory, computer-readable medium of claim 7, wherein the hardware component is a component of a network, and the hardware option is a replacement network component.

12. The non-transitory, computer-readable medium of claim 7, wherein the recommended hardware option includes a peripheral device that can be connected to the portion of user devices in the plurality of user devices.

13. A system for providing organizational hardware and software recommendations, comprising:
a memory storage including a non-transitory, computer-readable medium comprising instructions; and
a hardware-based processor that executes the instructions to carry out stages comprising:
aggregating performance data from a plurality of user devices associated with an organization;
aggregating performance data from a plurality of user devices associated with an organization;
identifying, based on the performance data, an issue experienced by a portion of user devices in the plurality of user devices at a rate above a threshold rate;
identifying a hardware component associated with a percentage of the plurality of user devices above a threshold percentage;
extracting data points from the performance data related to the hardware component;
inputting the extracted data points into a first machine learning ("ML") model;
receiving, as output from the first ML model, a hardware profile of the hardware component in relation to the issue, the hardware profile indicating measured performance levels of the hardware component in comparison to expected performance levels;
determining, based on the hardware profile, that the hardware component is the cause of the issue;
identifying, from a list of approved hardware, a hardware option that may fix the issue; and
providing a recommendation identifying the hardware option as a potential fix to the issue, wherein:
the issue is identified by inputting the performance data into a second ML model that learns issue trends and outputs an issue profile of the issue,
the issue profile is inputted into the first ML model with the extracted data points, and
the hardware option is identified by inputting the hardware profile into a third ML model that outputs the recommendation.

14. The system of claim 13, the stages further comprising automatically purchasing the hardware component from a third party based on a set of rules.

15. The system of claim 13, wherein the hardware component is a first user device model, and wherein the identifying the hardware option that can fix the issue includes identifying a second user device model.

16. The system of claim 13, wherein the first ML model cross-references the issue profile and extracted data points with third-party data to identify known issues with the hardware component related to the cause.

17. The system of claim 13, wherein the hardware component is a component of a network, and the hardware option is a replacement network component.

* * * * *